(12) United States Patent
Ozeki

(10) Patent No.: US 7,027,466 B1
(45) Date of Patent: Apr. 11, 2006

(54) MULTIPLEXER, DEMULTIPLEXER AND MULTIPLEX COMMUNICATION SYSTEM

(75) Inventor: Yukihiro Ozeki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/494,183

(22) Filed: Jan. 31, 2000

(30) Foreign Application Priority Data

Feb. 3, 1999 (JP) .......................................... 11-026094

(51) Int. Cl.
*H04J 3/06* (2006.01)

(52) U.S. Cl. ....................... 370/533; 370/527; 370/529; 370/535; 359/135; 375/353

(58) Field of Classification Search ................ 370/527, 370/529, 533, 535, 495, 499, 536; 359/135, 359/140, 115; 375/353, 260, 264, 268, 317, 375/320, 354; 332/115, 150, 155; 329/363
See application file for complete search history.

(56) References Cited

U.S. PATENT DOCUMENTS

| | | | | |
|---|---|---|---|---|
| 3,718,767 A | * | 2/1973 | Ellis ........................... | 370/496 |
| 5,786,918 A | * | 7/1998 | Suzuki et al. ................. | 398/98 |
| 5,805,321 A | * | 9/1998 | Ooi et al. .................... | 359/135 |
| 5,870,213 A | * | 2/1999 | Ishikawa et al. .............. | 398/98 |
| 6,067,180 A | * | 5/2000 | Roberts ....................... | 359/140 |
| 6,229,633 B1 | * | 5/2001 | Roberts et al. ............. | 359/135 |

OTHER PUBLICATIONS

Itsuro Morita, et al., "20Gbit/s Single-Channel Soliton Transmission over 9000km without inline Filters," *First Optoelectronics and Communications Conference (OECC '96) Technical Digest* (Jul. 1996), pp. 30–31.

* cited by examiner

*Primary Examiner*—Alpus H. Hsu
*Assistant Examiner*—Justin M. Philpott
(74) *Attorney, Agent, or Firm*—Rabin & Berdo, P.C.

(57) ABSTRACT

An optical multiplex communication system includes a multiplexer and a demultiplexer. In the multiplexer, one of two modulated optical pulse train signals is attenuated by an optical attenuator so that amplitudes of the two signals differ from each other. Then, the two signals are time-division multiplexed to produce a multiplexed optical pulse train signal. In the demultiplexer, a VD detector indirectly derives the amplitude of the extracted optical pulse train signal and outputs it to a comparator. A VR detector derives the mean amplitude of the multiplexed optical pulse train signal and outputs it to the comparator. Based on the inputted amplitudes, the comparator identifies the extracted optical pulse train signal. A controller and a mixer control the signal extraction timing such that the extracted optical pulse train signal as identified by the comparator agrees with selection designated by an externally inputted select signal.

11 Claims, 5 Drawing Sheets

MULTIPLEXER, DEMULTIPLEXER AND MULTIPLEX COMMUNICATION SYSTEM

BACKGROUND OF THE INVENTION

1. Field of the Invention

The present invention relates to a multiplexer, a demultiplexer and a multiplex communication system, such as an optical multiplex communication system or a radio multiplex communication system.

2. Description of the Related Art

In the conventional optical communication system, for example, an optical multiplexer is used for producing and transmitting a multiplexed optical pulse train signal of very high speed, e.g. no less than 10 Gb/s, and an optical demultiplexer is used for demultiplexing the received multiplexed optical pulse train signal.

Figure 5:
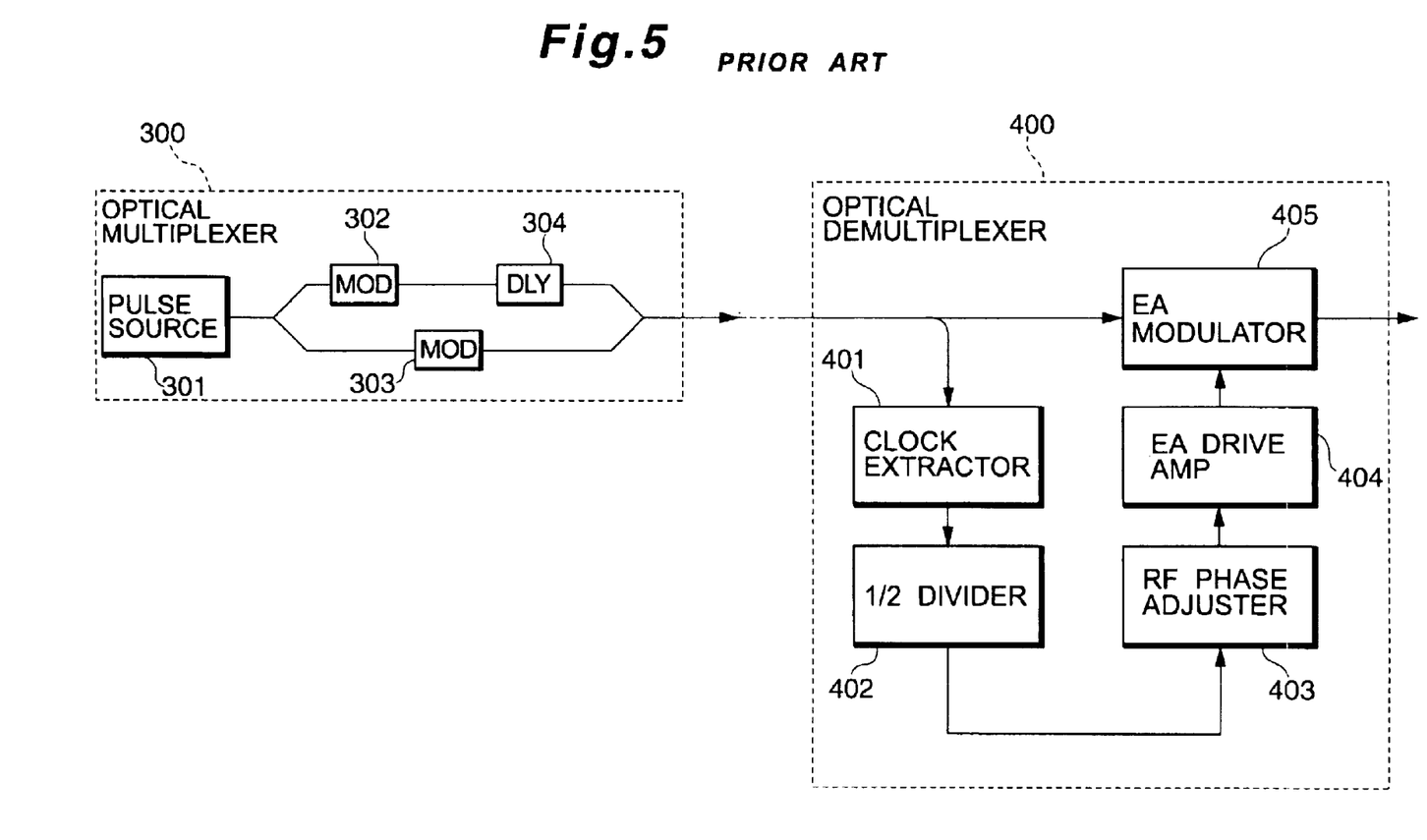
FIG. 5 is a block diagram showing a structure of a conventional optical multiplex communication system.

FIG. 5 shows an example of such a conventional optical multiplex communication system. The system includes an optical multiplexer 300 and an optical demultiplexer 400.

In the optical multiplexer 300, a basic optical pulse train or carrier with a period T, produced by an optical pulse source 301, is divided into two pulse trains which are then fed to two separate modulators, i.e. a modulator 302 and a modulator 303, respectively. The modulator 302 applies amplitude shift key modulation to the received pulse train with data 1 to produce a first optical pulse train signal, while the modulator 303 applies amplitude shift key modulation to the received pulse train with data 2 to produce a second optical pulse train signal. The first optical pulse train signal is then delayed by a half period (T/2) by a delay circuit 304 and combined with the second optical pulse train signal by an optical coupler or the like. Namely, the first and second optical pulse train signals are interleaved on a time axis, i.e. time-division multiplexed with each other over an interval of T/2, so that a multiplexed optical pulse train signal is produced and transmitted at a transmission rate twice the original (see (A) and (B) in FIG. 2).

On the other hand, in the optical demultiplexer 400, the multiplexed optical pulse train signal inputted through an optical fiber, an optical exchange or the like is fed to an optical input port of an electric field absorption type optical modulator (hereinafter referred to as "EA modulator") 405. Simultaneously, the multiplexed optical pulse train signal is also fed to a clock extractor 401 wherein a sine wave electric signal having the same period as the inputted multiplexed optical pulse train signal is produced from the inputted multiplexed signal. The electrical sine wave signal has a phase such that its crests coincide with the centers of pulses of the multiplexed optical pulse train signal (see (B) and (C) in FIG. 2). Then, the electrical sine wave signal is fed to a ½ divider 402 which produces an electrical sine wave signal (RF signal) with a period twice that of the inputted sine wave signal (see (D) in FIG. 2). The RF signal is fed to an EA drive amplifier 404 via an RF phase adjuster 403. The EA drive amplifier 404 adds a DC bias voltage to the RF signal so that a maximum value (including values around it) approximates to a high voltage of 0 [V] (see (E) in FIG. 2). The biased RF signal is then fed to a modulator drive input port of the EA modulator 405. The RF phase adjuster 403 is for correcting a phase difference caused at the clock extractor 401 and the ½ divider 402.

In the EA modulator 405, an optical pulse train signal fed to the optical input port is transmitted or passes therethrough when a high voltage around 0 [V] is inputted to the modulator drive input port, while it is blocked and not fed to an optical output port when a low voltage around some minus voltage is inputted to the modulator drive input port.

As described before, the multiplexed optical pulse train signal inputted to the EA modulator 405 is a signal obtained by time-division multiplexing the first and second optical pulse train signals with a period T/2. On the other hand, the EA modulator 405 transmits the multiplexed optical pulse train signal with a period T in response to the biased RF signal inputted from the EA drive amplifier 404. Accordingly, only one of the first and second optical pulse train signals is separated from the multiplexed signal and fed to the optical output port (see (F) in FIG. 2).

In the foregoing conventional optical multiplex communication system, however, there are problems that it is not possible to judge which of the first and second signals is extracted in the optical demultiplexer 400 and that selection between the first and second signals is not possible in the optical demultiplexer 400.

These problems are not limited to the optical multiplex communication system, but also applied to other multiplex communication systems such as a radio multiplex communication system.

SUMMARY OF THE INVENTION

Therefore, it is an object of the present invention to provide an improved multiplexer, an improved demultiplexer and an improved multiplex communication system which enables identification of a pulse train signal being separated from a multiplexed pulse train signal and further enables selection of a pulse train signal to be separated from a multiplexed pulse train signal.

According to one aspect of the present invention, in a multiplexer which divides a carrier pulse train having a predetermined amplitude into N pulse trains, modulates the N pulse trains by N data signals, respectively, to produce modulated N pulse trains, and time-division multiplexes the modulated N pulse trains, the improvement comprises an amplitude adjuster which introduces or implements an amplitude variation such that the modulated N pulse trains have different amplitudes from each other.

It may be arranged that the carrier pulse train has a period T between pulses therefore the modulated N pulse trains are time-division multiplexed with a phase difference of T/N.

It may be arranged that the carrier pulse train is an optical carrier pulse train.

It may be arranged that the N pulse trains are modulated by the N data signals through amplitude shift key modulation.

It may be arranged that the N pulse trains are modulated by the N data signals through pulse code modulation.

According to another aspect of the present invention, in a demultiplexer which receives a multiplexed modulated pulse train (produced by dividing a carrier pulse train having a predetermined amplitude into N pulse trains, modulating the N pulse trains by N data signals, respectively, to produce modulated N pulse trains, each with a different amplitude) and which extracts one of the modulated N pulse trains from the multiplexed modulated pulse train, the improvement comprises an amplitude detector for distinguishing or deriving an amplitude of one of the modulated N pulse trains which is extracted, the amplitude detector deriveing the amplitude directly or indirectly from the extracted modulated pulse train; and a judging circuit for identifying the extracted modulated pulse train based on the amplitude derived by the amplitude detector.

It may be arranged that the judging circuit comprises a mean amplitude detector for deriving a mean amplitude of the multiplexed modulated pulse train; and a comparator for comparing the amplitude of the extracted modulated pulse train derived by the amplitude detector and the mean amplitude of the multiplexed modulated pulse train derived by the mean amplitude detector, so as to identify the extracted modulated pulse train.

It may be arranged that the carrier pulse train has a period T between pulses thereof, and the multiplexed modulated pulse train is obtained by time-division multiplexing the modulated N pulse trains with a phase difference of T/N, and that the demultiplexer further comprises a passing/blocking circuit for passing the multiplexed modulated pulse train therethrough only when a voltage of a predetermined range is applied thereto, and for blocking the multiplexed modulated pulse train when a voltage of other than the predetermined range is applied thereto; a timing generator for generating a timing with respect to T based on T/N of the multiplexed modulated pulse train; a drive circuit which feeds a voltage of the predetermined range to the passing/blocking circuit at the time generated by the timing generator so that one of the modulated N pulse trains passes through the passing/blocking circuit; and a timing controller for controlling the timing generated by the timing generator so that the modulated pulse train identified by the judging circuit agrees with one of the modulated N pulse trains which is designated by an externally inputted select signal.

It may be arranged that the passing/blocking circuit converts the blocked multiplexed modulated pulse train into a current corresponding to an amplitude thereof, and the amplitude detector derives the amplitude of the extracted modulated pulse train based on the current fed from the passing/blocking circuit.

It may be arranged that N is 2, and that the voltage of the predetermined range of the passing/blocking circuit is periodically discrete relative to a voltage applied thereto, the timing generator produces a sine wave signal having the period T, the drive circuit adjusts the sine wave signal produced by the timing generator so that crest or trough portions of the sine wave signal reach the voltage of the predetermined range of the passing/blocking circuit to cause one of the two modulated pulse trains passes through the passing/blocking circuit, and the timing controller adds a given DC bias voltage to the sine wave signal produced by the timing generator so that trough or crest portions of the sine wave signal reach the voltage of the predetermined range of the passing/blocking circuit.

It may be arranged that the carrier pulse train is an optical carrier pulse train.

According to another aspect of the present invention, a multiplex communication system comprises a multiplexer which divides a carrier pulse train having a predetermined amplitude into N pulse trains, modulates the N pulse trains by N data signals, respectively, to produce modulated N pulse trains, and time-division multiplexes the modulated N pulse trains to produce a multiplexed modulated pulse train, the multiplexer comprising an amplitude adjuster which implements an amplitude adjustment so that the modulated N pulse trains have different amplitudes from each other; and a demultiplexer which receives the multiplexed modulated pulse train from the multiplexer, and extracts one of the modulated N pulse trains from the multiplexed modulated pulse train, the demultiplexer comprising an amplitude detector for distinguishing/deriving an amplitude of one of the modulated N pulse trains which is extracted, the amplitude detector deriving the amplitude directly or indirectly from the extracted modulated pulse train; and a judging circuit for identifying the extracted modulated pulse train based on the amplitude derived by the amplitude detector.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

<First Embodiment>

In this embodiment, the present invention is applied to an optical multiplex communication system wherein two optical pulse train signals are interleaved on a time axis, i.e. time-division multiplexed, to produce a multiplexed optical pulse train signal in a multiplexer and the received multiplexed optical pulse train signal is demultiplexed to extract one of the two optical pulse train signals in a demultiplexer.

Figure 1:
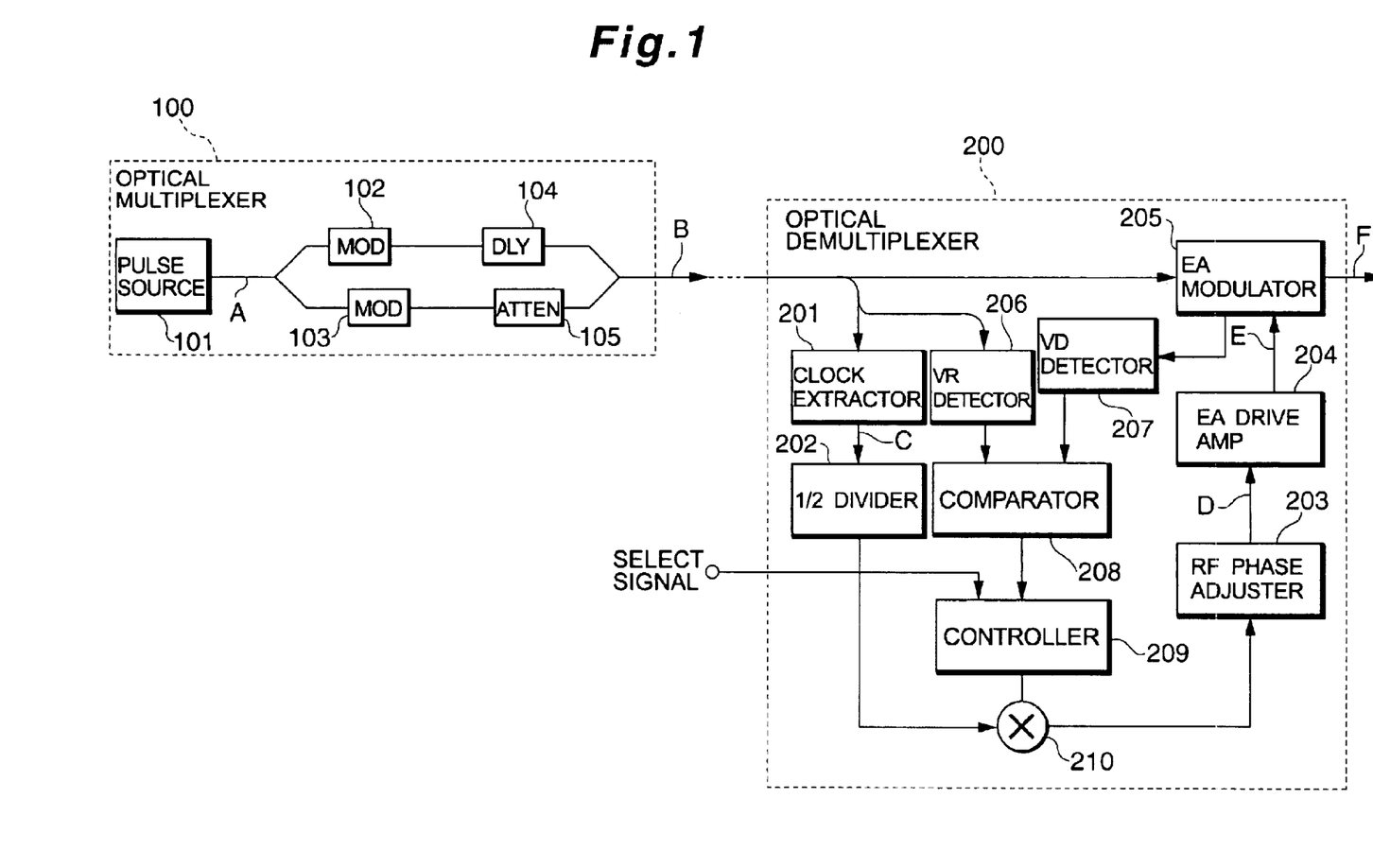
FIG. 1 is a block diagram showing a structure of an optical multiplex communication system according to a first preferred embodiment of the present invention.

FIG. 1 shows a structure of an optical multiplex communication system having an optical multiplexer 100 and an optical demultiplexer 200 according to the first preferred embodiment of the present invention. In FIG. 1, the optical multiplexer 100 comprises an optical pulse source 101, a modulator 102, a modulator 103, a delay circuit 104 and an optical attenuator 105. On the other hand, the optical demultiplexer 200 comprises a clock extractor 201, a ½ divider 202, an RF phase adjuster 203, an EA drive amplifier (electric field absorption type optical modulator drive amplifier) 204, an EA modulator (electric field absorption type optical modulator) 205, a VR detector 206, a VD detector 207, a comparator 208, a controller 209 and a mixer 210. The EA modulator 205 serves as a transmitting/blocking section, the VR detector 206 serves as a reference section, the VD detector 207 serves as a detection section, the comparator 208 serves as a judgment section, and together the controller 209, mixer 210, RF phase adjuster 203, and EA drive amplifier serve as a control section.

The components of the optical multiplexer 100 will be first described.

Figure 2:
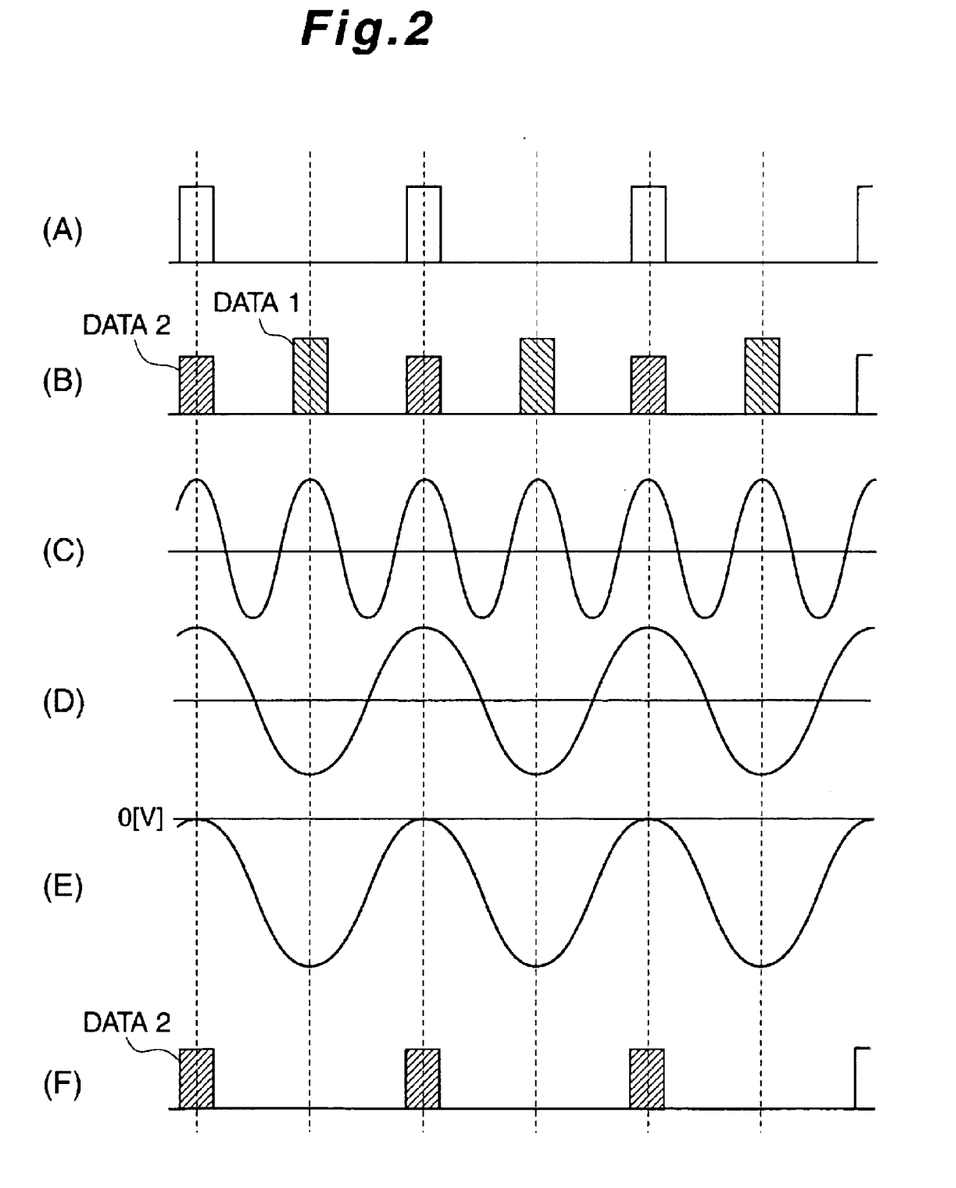
FIG. 2 is a diagram of waveforms outputted from associated components in the optical multiplex communication system shown in FIG. 1.

The optical pulse source 101 produces an optical pulse train or a carriar having a given amplitude and a given period T (see waveform (A) in FIG. 2 which corresponds to waveform at point A in FIG. 1). The optical pulse train from the optical pulse source 101 is divided into two optical pulse trains which are then inputted separately to the modulators 102 and 103, respectively.

The modulator 102 applies amplitude shift key modulation to the received optical pulse train with data 1 to produce a first optical pulse train signal (hereinafter referred to as "first signal S1"). On the other hand, the modulator 103 applies amplitude shift key modulation to the received optical pulse train with data 2 to produce a second optical pulse train signal (hereinafter referred to as "second signal S2").

The delay circuit 104 delays the first signal S1 from the modulator 102 by a half period (T/2).

The optical attenuator 105 attenuates the amplitude (power) of the second signal S2 from the modulator 103 so as to cause a difference in mean power between the first and second signals S1 and S2. As will be appreciated, since the amplitude shift key modulation is performed in the modulators 102 and 103, the mean power of each of the first and second signals S1 and S2 changes. Thus, the optical attenuator 105 attenuates the amplitude of the second signal S2 to a degree which can fully absorb an influence of such changes in mean power caused by the modulation. On the other hand, excessive attenuation causes deterioration of the S/N ratio so that the amplitude of the second signal is actually attenuated by several %. Hereinafter, the mean power of the first signal S1 outputted from the delay circuit 104 is referred to as "P1", while the mean power of the second signal S2 outputted from the optical attenuator 105 is referred to as "P2". As will be appreciated, the mean power is proportional to an integrated value of photocurrent.

The first signal S1 from the delay circuit 104 and the second signal S2 from the optical attenuator 105 are multiplexed by an optical coupler or the like to produce a multiplexed optical pulse train signal in which the first and second signals S1 and S2 are alternately repeated with a period T/2 (see waveform (B) in FIG. 2 which corresponds to waveform at point B in FIG. 1). The produced multiplexed optical pulse train signal is then outputted to the optical demultiplexer 200 via an optical fiber, an optical exchange or the like.

Now, the components of the optical demultiplexer 200 will be described.

In response to receiving the multiplexed optical pulse train signal from the optical multiplexer 100, the clock extractor 201 produces an electrical sine wave signal having the same period (T/2) as the received multiplexed optical pulse train signal (see waveform (C) in FIG. 2 which corresponds to waveform at point C in FIG. 1). The electrical sine wave signal has a phase such that its crests coincide with the centers of pulses of the multiplexed optical pulse train signal.

In response to receipt of the electrical sine wave signal from the clock extractor 201, the ½ divider 202 produces an electrical sine wave signal having a period twice that of the inputted electrical sine wave signal. The electrical sine wave signal produced at the ½ divider will be referred to as "RF signal". It serves as a pulse-sieving signal to screen for the desired pulses, as will be discussed later. The RF signal has a phase such that its maximum (crest) and minimum (trough) value points coincide with maximum value points of the electrical sine wave signal produced at the clock extractor 201. Specifically, since the multiplexed optical pulse train signal includes the first and second signals S1 and S2 which are alternately repeated every T/2, crest potions of the RF signal correspond to pulses of one of the first and second signals S1 and S2.

The RF phase adjuster 203 corrects a phase difference of the RF signal caused by delays generated at the clock extractor 201, the ½ divider and the mixer 210 (the phase corrected RF signal is shown as waveform (D) in FIG. 2 which corresponds to waveform at point D in FIG. 1).

The EA drive amplifier 204 adds a DC bias voltage to the RF signal from the RF phase adjuster 203 so that its maximum value (including values around it) approximates to a high voltage of 0 [V] (the biased RF signal is shown as waveform (E) in FIG. 2 which corresponds to waveform at point E in FIG. 1). The biased RF signal is then fed to the EA modulator 205.

The EA modulator 205 has an optical input port, an optical output port and a control port or modulator drive input port. The multiplexed optical pulse train signal from the optical multiplexer 100 is fed to the optical input port of the EA modulator 205. When a high voltage around 0 [V] is inputted to the modulator drive input port, the EA modulator 205 transmits or passes the inputted multiplexed optical pulse train signal therethrough to feed it to the optical output port. On the other hand, when a low voltage typically a negative voltage is applied to the modulator drive input port, the EA modulator 205 absorbs the inputted multiplexed optical pulse train signal so as not to feed it to the optical output port. Accordingly, the EA modulator 205 transmits the optical pulse train signal corresponding to the crest portion (around 0 [V]) of the biased RF signal from the EA drive amplifier 204, and absorbs the other optical pulse train signal (the transmitted optical pulse train signal is shown as waveform (F) in FIG. 2, which corresponds to waveform at point F in FIG. 1). The EA modulator 205 converts the energy of the absorbed optical pulse train signal into current and outputs it to the VD detector 207. Specifically, one of the first signal S1 and second signal S2 is transmitted and fed to the optical output port, while the other of the first signal Si and second signal S2 is absorbed and its power is converted into current and outputted to the VD detector 207.

In response to receipt of the multiplexed optical pulse train signal from the optical multiplexer 100, the VR detector 206 derives a mean value of P1 and P2, i.e. (P1+P2)/2. This means that the VR detector 206 derives a mean amplitude of the multiplexed optical pulse train signal. Then, the VR detector 206 produces a voltage signal VR indicative of the mean value of (P1+P2)/2 and outputs it to the comparator 208.

The VD detector 207 derives a mean value of the current from the EA modulator 205 corresponding to the absorbed optical pulse train signal so as to obtain P1 or P2. This means that the VD detector 207 derives an amplitude of either the first singnal S1 or second signal S2. Then, the VD detector 207 produces a voltage signal VD indicative of the obtained P1 or P2 and outputs it to the comparator 208.

The VR detector 206 and the VD detector 207 derive the foregoing power values, produce VR and VD and output them to the comparator 208 per preset proper timing.

The comparator 208 compares VR indicative of (P1+P2)/2 given from the VR detector 206 and VD indicative of P1 or P2 given from the VD detector 207 and, based on a result of the comparison, feeds a binary signal of "high" or "low" to the controller 209. In this embodiment, since the second signal is attenuated at the optical attenuator 105 as described before, P1>P2. Accordingly, for example, when VD>VR, the comparator 208 outputs "low", meaning that the second signal is transmitted through the EA modulator 205. On the other hand, when VD<VR, the comparator 208 outputs "high", meaning that the first signal is transmitted through the EA modulator 205.

When the binary signal ("high" or "low") fed from the comparator 208 and a binary select signal VS which is externally set have the same value, the controller 209 implements nothing. On the other hand, when a value of the binary signal from the comparator 208 differs from a value of the binary select signal VS, the controller 209 controls the mixer 210 to invert the polarity of the RF signal from the ½ divider 202 and output the inverted RF signal to the RF phase adjuster 203. For example, in this embodiment, when the select signal VS is "high" while the binary signal from the comparator 208 is also "high", the controller 209 performs nothing so that the first signal continues to be outputted from the EA modulator 205. On the other hand, when the select signal VS is "high" while the binary signal from the comparator 208 is "low", the controller 209 controls the mixer 210 to invert the polarity of the RF signal so that the optical pulse train signal outputted from the EA modulator 205 is switched from the second signal to the first signal.

As described above, the mixer 210 inverts the polarity of the RF signal from the ½ divider 202 and outputs it to the RF phase adjuster 203 under the control of the controller 209.

In this embodiment, as described above, in the optical multiplexer 100, prior to time-division multiplexing the first singnal S1 and second signal S2, the second signal S2 is attenuated by the optical attenuator 105 so that P1>P2.

In the optical demultiplexer 200, when the first signal Si or second signal S2 is transmitted through the EA modulator 205, the second sigal S2 or first signal S1 is absorbed in the EA modulator 205. Thus, the photocurrent proportional to P2 or P1 is fed to the VD detector 207 from the EA modulator 205. The VD detector 207 derives P2 or P1 based on the inputted photocurrent and outputs a voltage signal VD indicative of P2 or P1 to the comparator 208. By comparing the voltage signal VD with a voltage signal VR indicative of (P1+P2)/2 from the VR detector 206, it can be determined which of the first and second signals S1 and S2 is transmitted through the EA modulation 205.

In this embodiment, the comparator 208 outputs "low" when VD>VR, meaning that the second signal S2 is transmitted through the EA modulator 205. In this case, if the select signal VS is "high", the controller 209 controls the mixer 210 to invert the polarity of the RF signal fed from the mixer 210 to the EA drive amplifier 204 via the RF phase adjuster 203. As will be appreciated, in this event, if the polarity of the RF signal from the ½ divider 202 has already been inverted, the controller 209 controls the mixer 210 to restore the polarity of the RF signal. Due to the inversion of the polarity of the RF signal fed to the EA drive amplifier 204, the optical pulse train signal transmitted through the EA modulator 205 is switched from the second signal S2 to the first signal S1. Thus, VD<VR is detected at the comparator so that an output from the comparator 208 becomes "high". Accordingly, the output from the comparator 208 agrees with the select signal VS and thus the controller 209 implements nothing to maintain such a state.

Instead of VR indicative of (P1+P2)/2, VD indicative of P1 or P2 derived at the VD detector 207 may be compared with a fixed value. However, using VR as a reference value for the comparison, even if the multiplexed optical pulse train signal is attenuated through the optical fiber, the optical exchange or the like, the optical pulse train signal transmitted through the EA modulator 205 can be precisely identified. Accordingly, if the attenuation caused in the optical fiber, the optical exchange or the like is small enough to raise no problem for judging the magnitude of VD, a fixed value or another value may be used instead of VR. In this case, the VR detector 206 is not required.

As described above, according to the foregoing first preferred embodiment, the optical multiplexer 100 includes the optical attenuator 105 which attenuates the second signal S2 so as to cause a difference between the mean power P1 of the first signal S1 and the mean power P2 of the second signal S2. The optical demultiplexer 200 includes the VR detector 206 for deriving the mean value of P1 and P2, i.e. (P1+P2)/2 of the multiplexed optical pulse train signal fed from the optical multiplexer 100, the VD detector 207 for deriving P1 or P2 absorbed in the EA modulator 205, the comparator 208 for comparing the voltage signal VR indicative of (P1+P2)/2 and the voltage signal VD indicative of P1 or P2, and the controller 209 and the mixer 210 for inverting the polarity of the RF signal when the result of the comparison differs from the externally inputted select signal. Accordingly, in the optical demultiplexer 200, it is possible to select one of the first singnal S1 and second signal S2 to be extracted by externally inputting the select signal. Furthermore, even if the synchronization fails once in the optical demultiplexer 200, it can be automatically restored. Further, since the photocurrent corresponding to the power absorbed in the EA modulator 205 is used for judging the transmitted signal, attenuation of the output light for that purpose can be prevented.

<Second Embodiment>

In this embodiment, as in the foregoing first preferred embodiment, the present invention is applied to an optical multiplex communication system wherein two optical pulse train signals are interleaved on a time axis, i.e. time-division multiplexed, to produce a multiplexed optical pulse train signal in a multiplexer and the received multiplexed optical pulse train signal is demultiplexed to extract one of the two optical pulse train signals in a demultiplexer.

Figure 3:
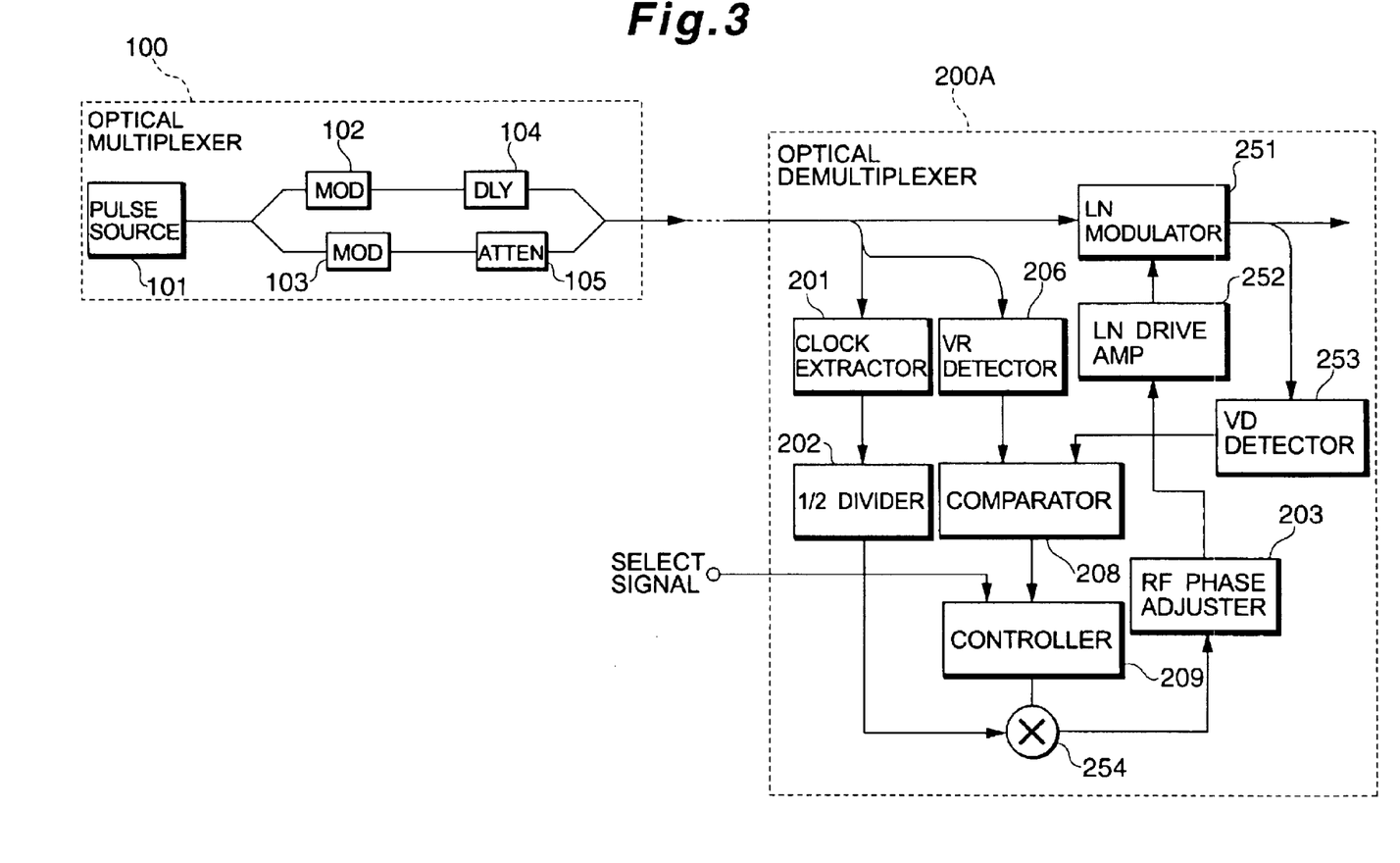
FIG. 3 is a block diagram showing a structure of an optical multiplex communication system according to a second preferred embodiment of the present invention.

FIG. 3 shows a structure of an optical multiplex communication system having an optical multiplexer 100 and an optical demultiplexer 200A according to the second preferred embodiment of the present invention. In FIG. 3, the optical multiplexer 100 comprises an optical pulse source 101, a modulator 102, a modulator 103, a delay circuit 104 and an optical attenuator 105. On the other hand, the optical demultiplexer 200A comprises a clock extractor 201, a ½ divider 202, an RF phase adjuster 203, a VR detector 206, a comparator 208, a controller 209, a lithium niobate Mach-Zehnder interferometer type optical modulator (hereinafter referred to as "LN modulator") 251, an LN drive amplifier 252, a VD detector 253 and a bias apply circuit 254.

In FIG. 3, the same components as those shown in FIG. 1 are assigned the same reference signs so as to omit explanation thereof. Therefore, the LN modulator 251, the LN drive amplifier 252, the VD detector 253 and the bias apply circuit 254 in the optical demultiplexer 200A will be described hereinbelow.

The LN modulator 251 has an optical input port, an optical output port and a modulator drive input port. The multiplexed optical pulse train signal from the optical multiplexer 100 is fed to the optical input port of the LN modulator 251. The transmittance of the LN modulator 251 from the optical input port to the optical output port changes between 0 and 1 in a sine wave fashion every period, $2 \cdot V_s$, depending on values of the voltage applied to the modulator drive input port. Specifically, when a given voltage causing the transmittance of the LN modulator 251, to be 1 or around 1, is applied to the modulator drive input port of the LN modulator 251, an optical pulse train signal fed to the optical input port is transmitted to the optical output port, while otherwise, the optical pulse train signal is blocked and thus not fed to the optical output port.

The LN drive amplifier 252 adds a proper DC bias voltage to the RF signal fed thereto via the RF phase adjuster 203 such that a maximum value (including values around it) of the RF signal, in the state where the RF signal is not biased by the bias apply circuit 254, reaches the foregoing given voltage which causes the transmittance of the LN modulator 251 to be 1 or around 1. The LN drive amplifier 252 feeds such a biased RF signal to the modulator drive input port of the LN modulator 251. The amplitude of the RF signal is set exactly equal to V, of the LN modulator 251.

In contrast to the EA modulator 205 in the foregoing first preferred embodiment, the LN modulator 251 does not convert the power of the absorbed optical pulse train signal into the current for feeding to the VD detector 253. Therefore, the VD detector 253 derives the mean power P1 or P2 of the first or second optical pulse train signal S1 or S2 outputted from the optical output port of the LN modulator 251 and feeds a voltage signal VD indicative of P1 or P2 to the comparator 208.

Upon switching the optical pulse train signal, between the first and second signals S1 and S2, to be outputted from the LN modulator 251, the bias apply circuit 254, under the control of the controller 209, adds a proper DC bias voltage, to the RF signal fed from the ½ divider 202 so that a minimum value (including values around it) of the RF signal biased by the bias apply circuit 254 reaches the foregoing given voltage which causes the transmittance of the LN modulator 251 to be 1 or around 1. As a result, a phase of the RF signal where the transmittance becomes 1 or around 1 is shifted by 180 degrees so that the optical pulse train signal to be outputted from the LN modulator 251 is changed between the first and second signals S1 and S2.

Now, an operation of the optical multiplex communication system having the foregoing structure will be described mainly with respect to points which differ from the foregoing first preferred embodiment.

In the optical demultiplexer 200, in response to receipt of the multiplexed optical pulse train signal from the optical multiplexer 100, the VR detector 206 derives the mean value of P1 and P2, i.e. (P1+P2)/2 of the received multiplexed optical pulse train signal and feeds the voltage signal VR indicative of (P1+P2)/2 to the comparator 208. On the other hand, the VD detector 253 derives P1 or P2 of the first signal S1 or second signal S2 transmitted through the LN modulator 251 and feeds the voltage signal VD indicative of P1 or P2 to the comparator 208.

The comparator 208 compares VR and VD. If VD>VR, the comparator 208 outputs "high" to the controller 209, meaning that the first signal S1 is transmitted through the LN modulator 251. On the other hand, if VD<VR, the comparator 208 outputs "low" to the controller 209, meaning that the second signal S2 is transmitted through the LN modulator 251.

If the externally inputted select signal VS is "low" while the comparator 208 also outputs "low", the controller 209 performs nothing so that the second signal S2 continues to be outputted from the LN modulator 251. On the other hand, if the select signal VS is "low" while the comparator 208 outputs "high", the controller 209 controls the bias apply circuit 254 to add a proper DC bias voltage to the RF signal from the ½ divider 202 such that if a maximum or minimum value of the RF signal is the foregoing given voltage which causes the transmittance of the LN modulator 251 to be 1 or around 1, the DC bias voltage is added to the RF signal to cause a minimum or maximum value of the RF signal becomes the foregoing given voltage which causes the transmittance of the LN modulator 251 to be 1 or around 1. As a result, a phase of the RF signal where the transmittance becomes 1 or around 1 is shifted by 180 degrees so that the optical pulse train signal to be outputted from the LN modulator 251 is changed from the first signal S1 to the second signal S2.

Waveforms outputted from the associated components in this embodiment are almost the same as those shown in FIG. 2, but a waveform outputted from the LN drive amplifier 252 to the LN modulator 251 slightly differs from the waveform (E) shown in FIG. 2. Accordingly, FIG. 4 shows the waveform outputted from the LN drive amplifier 252 to the LN modulator 251.

Figure 4:
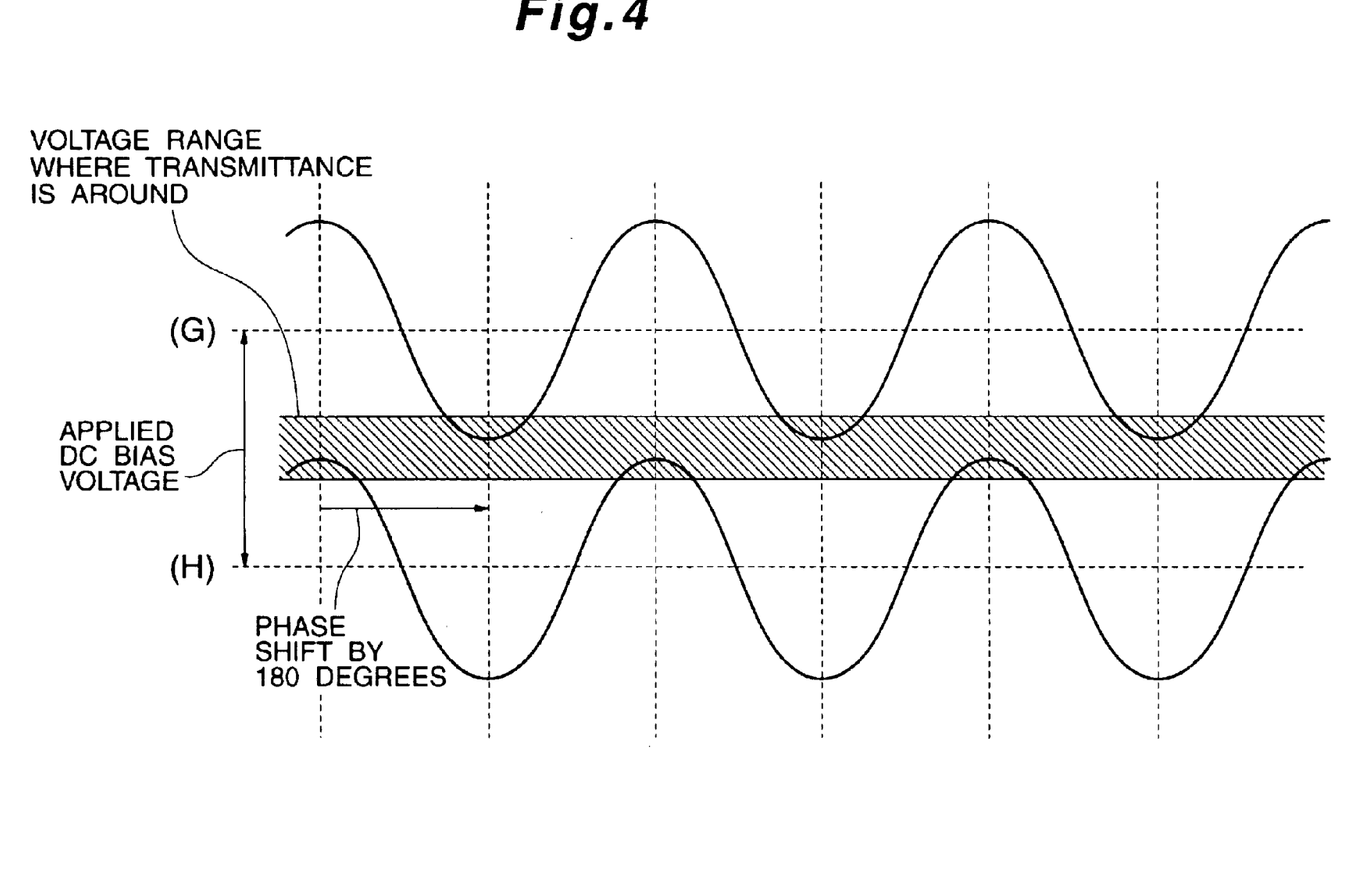
FIG. 4 is a diagram of waveforms outputted from an associated component in the optical multiplex communication system shown in FIG. 3.

The LN drive amplifier 252 adds a proper DC bias voltage (which is not "APPLIED DC BIAS VOLTAGE" as indicated in FIG. 4) to the RF signal so that a maximum value (including values around it) of the RF signal in the state where the RF signal is not biased by the bias apply circuit 254 reaches the foregoing given voltage which causes the transmittance of the LN modulator 251 to be 1 or around 1 (see (H) in FIG. 4). Upon switching the optical pulse train signal, between the first signal S1 and second signal S2, to be outputted from the LN modulator 251, the bias apply circuit 254, under the control of the controller 209, adds a proper DC bias voltage (which is "APPLIED DC BIAS VOLTAGE" as indicated in FIG. 4) to the RF signal so that a minimum value (including values around it) of the RF signal reaches the foregoing given voltage which causes the transmittance of the LN modulator 251 to be 1 or around 1. As a result, a phase of the RF signal where the transmittance becomes 1 or around 1 is shifted by 180 degrees so that the optical pulse train signal to be outputted from the LN modulator 251 is changed between the first signal S1 and second signal S2.

As described above, according to the second preferred embodiment, the optical demultiplexer 200A includes the LN modulator 251 instead of the EA modulator 205 in the first preferred embodiment, the LN drive amplifier 252 for driving the LN modulator 251, the VD detector 253 for deriving P1 or P2 of the first signal S1 or second signal S2 outputted from the LN modulator 251, and the bias apply circuit 254 for adding the proper DC bias voltage to the RF signal so that the minimum value (including values around it) of the RF signal reaches the foregoing given voltage which causes the transmittance of the LN modulator 251 to be 1 or around 1. Accordingly, like the first preferred embodiment, in the optical demultiplexer 200A, it is possible to select one of the first signal S1 and second signal S2 to be extracted by externally inputting the select signal. Further, even if the synchronization fails once in the optical demultiplexer 200A, it can be automatically restored.

Furthermore, according to the second preferred embodiment, in contrast to the first preferred embodiment, since the selection of the optical pulse train signal outputted from the LN modulator 251 can be carried out only by shifting the DC bias voltage of the bias apply circuit 254, the high-speed component such as the mixer is not required.

<Other Embodiments>

In the foregoing preferred embodiments, the present invention is applied to the optical multiplex communication system wherein the two optical pulse train signals are time-division multiplexed and one of them is extracted. However, the number of the optical pulse train signals is not limited to two but N which represents an integer greater than one. In this case, a delay circuit which can adjust a phase of the RF signal in N stages is newly provided instead of the mixer 210 in the first preferred embodiment and the bias apply circuit 254 in the second preferred embodiment. Then, the comparator 208 compares VR from the VR detector and VD from the VD detector so as to judge which of the N optical pulse train signals is transmitted through the EA or LN modulator. Based on a result of the judgment, the controller 209 controls the newly provided delay circuit to adjust the phase of the RF signal so that one of the N optical pulse train signals, selected by the select signal VS, is outputted from the EA or LN modulator. In this case, however, since the N optical pulse train signals are time-division multiplexed, the pulse width of pulses produced at the optical pulse source 101 should be less than TIN.

In the foregoing preferred embodiments, the present invention is applied to the optical multiplex communication system. However, the present invention is also applicable to other multiplex communication systems such as a radio multiplex communication system.

In the foregoing preferred embodiments, the amplitude shift key modulation is implemented. Instead of this method, the pulse code modulation may be implemented.

In the foregoing preferred embodiments, the power of the second signal is attenuated by the optical attenuator 105. On the other hand, an optical amplifier may be provided subsequent to the modulator 102 to amplify the power of the first signal S1. Alternatively, it may be that P1<P2.

In the foregoing preferred embodiments, the first signal S1 and second signal S2 are time-division multiplexed after the second signal S2 is attenuated by the optical attenuator 105. However, it may be arranged that one of the first signal S1 and second signal S2 is attenuated with proper timing after the first signal S1 and second signal S2 are time-division multiplexed.

In the foregoing first preferred embodiment, the mean power of the optical pulse train signal absorbed at the EA modulator 205 is derived at the TD detector 207 based on the photocurrent fed from the EA modulator 205. However, the VD detector 207 may derive the mean power of the optical pulse train signal outputted from the optical output port of the EA modulator 205 like the VD detector 253 in the second preferred embodiment.

In the second preferred embodiment, the bias apply circuit 254 is provided. However, instead of this, the mixer 210 may be provided as in the first preferred embodiment so as to invert the polarity of the RF signal.

While the present invention has been described in terms of the preferred embodiments, the invention is not to be limited thereto, but can be embodied in various ways without departing from the principle of the invention as defined in the appended claims.

What is claimed is:

1. A multiplex communication system comprising:
 a multiplexer which divides a carrier pulse train having a predetermined amplitude into N pulse trains, modulates said N pulse trains by N data signals, respectively, to produce N modulated pulse trains, and time-division multiplexes said N modulated pulse trains to produce a multiplexed modulated pulse train, said multiplexer comprising an amplitude adjuster which implements an amplitude adjustment so that said N modulated N pulse trains have different amplitudes from each other; and
 a demultiplexer which comprises
  a transmitting/blocking section having an input port that receives the multiplexed modulated pulse train, a control signal corresponding to one of the N modulated pulse trains, and an output port that emits said one of the N modulated pulse trains corresponding to the control signal;
  a reference section which receives the multiplexed modulated pulse train and generates a reference signal representing the average amplitude of pulses in the N modulated pulse trains;
  a detection section which generates a detection signal with information identifying said one of the N modulated pulse trains that is emitted by the transmitting/blocking section;
  a judgment section which compares the reference signal to the detection signal and generates a judgment signal; and
  a control section which generates the control signal for the transmitting/blocking section on the basis of at least the judgment signal and an electrical select signal that designates one of the modulated pulse trains,
 wherein N is two, and the transmitting/blocking section blocks one of the two pulse trains and transmits the other to the output port of the transmitting/blocking section, and
 wherein the detection section receives an electrical signal that is generated by the transmitting/blocking section from energy absorbed from the blocked signal.

2. A demultiplexer for a time-division multiplexed pulse train that contains a plurality of modulated pulse trains which are generated by modulating un-modulated pulse trains with data signals, the un-modulated pulse trains having different pulse amplitudes, comprising:
 a transmitting/blocking section having an input port that receives the multiplexed pulse train, a control signal corresponding to one of the modulated pulse trains, and an output port that emits the modulated pulse train corresponding to the control signal;
 a reference section which receives the multiplexed pulse train and generates a reference signal representing the average amplitude of pulses in the modulated pulse trains;
 a detection section which generates a detection signal with information identifying the modulated pulse train emitted by the transmitting/blocking section;
 a judgment section which compares the reference signal to the detection signal and generates a judgment signal; and
 a control section which generates the control signal for the transmitting/blocking section on the basis of at least the judgment signal and an electrical select signal that designates one of the modulated pulse trains,
 wherein the multiplexed pulse train contains two modulated pulse trains and the transmitting/blocking section blocks one of the two modulated pulse trains and transmits the other to the output port of the transmitting/blocking section, and
 wherein the detection section receives an electrical signal that is generated by the transmitting/blocking section from energy absorbed from the blocked pulse train.

3. The demultiplexer of claim 2, further comprising a clock extractor that receives the multiplexed pulse train and generates a clock signal from it, and a divider that divides the clock signal, the divided clock signal being supplied to the control section.

4. A demultiplexer for a time-division multiplexed pulse train that contains a plurality of modulated pulse trains which are generated by modulating un-modulated pulse trains with data signals, the un-modulated pulse trains having different pulse amplitudes, comprising:
 a transmitting/blocking section having an input port that receives the multiplexed pulse train, a control signal corresponding to one of the modulated pulse trains, and an output port that emits the modulated pulse train corresponding to the control signal;

a reference section which receives the multiplexed pulse train and generates a reference signal representing the average amplitude of pulses in the modulated pulse trains;

a detection section which generates a detection signal with information identifying the modulated pulse train emitted by the transmitting/blocking section;

a judgment section which compares the reference signal to the detection signal and generates a judgment signal;

a control section which generates the control signal for the transmitting/blocking section on the basis of at least the judgment signal and an electrical select signal that designates one of the modulated pulse trains; and a clock extractor that receives the multiplexed pulse train and generates a clock signal from it, and a divider that divides the clock signal, the divided clock signal being supplied to the control section, wherein the control section comprises a controller that receives the judgment signal and the select signal, a phase shifting component that receives the divided clock signal and an output signal from the controller and that generates a pulse-sieving signal as an output, a phase adjuster that adjusts the phase of the pulse-sieving signal, and a drive amplifier that receives the phase-adjusted pulse-sieving signal and generates the control signal from it.

5. The demultiplexer of claim 4, wherein the control section selectively shifts the phase of the divided clock signal or maintains the phase substantially unchanged, in response to the select signal and the judgment signal.

6. The demultiplexer of claim 4, wherein the pulses of the pulse trains are optical pulses and the transmitting/blocking section is an electric field absorption optical modulator, the detection section receiving a signal from the modulator.

7. The demultiplexer of claim 4, wherein the pulses of the pulse trains are optical pulses and the transmitting/blocking section is an optical modulator employing a Mach-Zehnder interferometer.

8. The demultiplexer of claim 7, further comprising a detector that detects the modulated pulse train emitted by the optical modulator, the detection section receiving a signal from the optical modulator.

9. The demultiplexer of claim 2, wherein the pulses of the two modulated pulse trains are optical pulses, wherein the two modulated pulse trains have pulse periods that are substantially the same, and further comprising means for generating a sinusoidal signal having a period that is substantially the same as the pulse period of the modulated pulse trains.

10. The demultiplexer of claim 9, wherein the means comprises a clock extractor that receives the multiplexed pulse train, and a divide by two divider that divides an output signal from the clock extractor to generate the sinusoidal signal.

11. The demultiplexer of claim 10, wherein the control section comprises means, responsive to the judgment signal and the select signal, for selectively inverting or not inverting the sinusoidal signal.

* * * * *